United States Patent
Lee et al.

(10) Patent No.: US 7,147,049 B2
(45) Date of Patent: Dec. 12, 2006

(54) HEAT EXCHANGER OF VENTILATING SYSTEM

(75) Inventors: Seong-Hwan Lee, Kyungsangnam-Do (KR); Min-Chul Cho, Busari (KR); Soo-Yeon Shin, Kyungsangnam-Do (KR); Sung-Hwa Lee, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/537,154

(22) PCT Filed: Dec. 2, 2002

(86) PCT No.: PCT/KR02/02266

§ 371 (c)(1),
(2), (4) Date: May 31, 2005

(87) PCT Pub. No.: WO2004/051173

PCT Pub. Date: Jun. 17, 2004

(65) Prior Publication Data
US 2006/0054309 A1     Mar. 16, 2006

(51) Int. Cl.
*F28F 3/06* (2006.01)
(52) U.S. Cl. ..................... 165/166; 165/109.1
(58) Field of Classification Search ............... 165/164, 165/166, 109.1
See application file for complete search history.

(56) References Cited

U.S. PATENT DOCUMENTS

| 2,359,288 A | * | 10/1944 | Brinen | 165/174 |
| 2,691,991 A | * | 10/1954 | Schutt et al. | 165/174 |
| 3,783,938 A | * | 1/1974 | Chartet | 165/166 |
| 4,899,812 A | * | 2/1990 | Altoz | 165/109.1 |
| 6,729,388 B1 | * | 5/2004 | Emrich et al. | 165/153 |

FOREIGN PATENT DOCUMENTS

| FR | 2804471 A | 8/2001 |
| JP | 10-122787 A | 5/1998 |
| SU | 556311 A | 4/1977 |

* cited by examiner

*Primary Examiner*—Teresa J. Walberg
(74) *Attorney, Agent, or Firm*—Birch, Stewart, Kolasch & Birch, LLP

(57) ABSTRACT

A heat exchanger of a ventilating system, including heat exchange plates which are laminated at a predetermined interval, first vibration members which are laminated among the heat exchange plates, for generating turbulence in outdoor air passing through a first air path, being aligned in the first air path through which the outdoor air passes and second vibration members for generating turbulence in the indoor air passing through a second air path, while being aligned in the second air path through which indoor air passes, can improve heat transfer performance by increasing turbulence of air by positioning a mesh type heat exchange in a air path through which outdoor and indoor air passes.

15 Claims, 6 Drawing Sheets

HEAT EXCHANGER OF VENTILATING SYSTEM

TECHNICAL FIELD

The present invention relates to a ventilating system for exchanging indoor air and outdoor air and particularly, to a heat exchanger of a ventilating system, capable of improving heat exchanging performance between outdoor air and indoor air.

BACKGROUND ART

Generally, a ventilating system is a system for discharging polluted indoor air to the outdoor and sucking fresh outdoor air to the indoor, and the system includes an air cleaner for removing dust and foreign materials contained in the outdoor air, and a heat exchanger for transferring heat of the discharged indoor air to the sucked outdoor air.

FIG. 1 is a perspective view showing a conventional ventilating system.

The ventilating system includes a case 2 which is mounted on a wall for dividing indoor and outdoor, ventilating fans 4 and 6 which are mounted in the case 2, for ventilating air which is sucked and discharged, an air cleaner (not shown) which is installed in a portion to which the outdoor air inside the case 2 is sucked, for cleaning the outdoor air sucked to the indoor, and a heat exchanger 8 which is positioned inside the case 2, for performing a heat exchanging operation of indoor air discharged the outdoor and outdoor air sucked to the indoor.

Here, the case 2 is disposed in a hole formed on the wall for diving the indoor and outdoor, and accordingly, one side is positioned indoors and the other side is positioned outdoors. At this time, an outdoor suction hole 10 to which outdoor air is sucked and an indoor discharging hole 12 through which indoor air is discharged to the outdoor are respectively formed on the side wall of the case 2 positioned outdoors, and an indoor discharging hole 14 through which outdoor air is discharged to the indoor and indoor suction hole 16 to which indoor air is sucked to the outdoor are respectively formed on the side wall of the case 2 positioned indoors.

The ventilating fans 4 and 6 includes a discharging blowing fan 4 which is installed in a position connected with the outdoor discharging hole 12, for providing a blowing pressure for discharging the indoor air to the outdoor, and a suction blowing fan 6 which is installed in a position connected with the indoor discharging hole 14, for providing a blowing pressure for sucking the outdoor air to the indoor.

FIG. 2 is a perspective view showing a conventional heat exchanger of a ventilating system, and FIG. 3 is a partial perspective view showing the conventional heat exchanger of a ventilating system.

The conventional heat exchanger 8 includes a plurality of base plates 20 which are laminated at a regular interval in a shape of a thin plate, first corrugation plates 22 which are respectively laminated in the spaces among the base plates 20, through which indoor air passes, and second corrugation plates 24 which are respectively laminated in the base plates 20 to be mutually crossed with the first corrugation plates 22 in turn, through which outdoor air passes.

Here, the first and second corrugation plates 22 and 24 are curved in a triangular shape, and indoor and outdoor air passes to the inner and outer sides thereof, thus to mutually exchange heat.

Such heat exchanger 8 is formed in a rectangular shape by sequentially laminating the first corrugation plates 22, base plates 20, and second corrugation plates 24. The upper and lower surfaces of the heat exchanger 8 are respectively closed by the base plate 20, and the both side surfaces of the heat exchanger are connected with the outdoor suction hole 10 and indoor discharging hole 14, and outdoor air passes therethrough. Another both side surfaces of the heat exchanger are respectively connected with the outdoor discharging hole 12 and indoor suction hole 16, and indoor air passes therethrough.

That is, as the outdoor air which passes the first corrugation plates 22 and indoor air which passes the second corrugation plates 24 pass while being crossed with each other, heat exchange is performed by transferring heat of the indoor air through the base plates 20.

The operation of the conventional heat exchanger for the ventilating system with the above structure will be described as follows.

When the sucking blowing fan 6 is driven, the outdoor air is sucked to the outdoor suction port 10 and is supplied to the indoor through the indoor discharging hole 14 by passing the first corrugation plate 22. When the discharging blowing fan 4 is driven, the indoor air is sucked through the indoor suction hole 16 and discharged to the indoor through the outdoor discharging hole 12 by passing the second corrugation plate 24.

Here, as the outdoor air passing in the first corrugation plate 22 and indoor air passing the second corrugation plate 24 flow while being crossed with each other, heat in the indoor air is transferred to the outdoor air through the base plate 20, and the outdoor air which sucked the heat of the indoor air is supplied to the indoor.

As described above, since heat in the discharged indoor air is sucked to the outdoor air and discharged to the indoor, rapid temperature change of the indoor air can be prevented in case of operating ventilation.

However, in the conventional heat exchanger of the ventilating system, the first and second corrugation plates 22 and 24 are formed in a shape of a plate having a corrugation of a predetermined shape, and a boundary layer S is developed as the air flowing in the first and second corrugation plates moves along from the inlet side to the outlet side. Therefore, heat transfer efficiency is degraded and indoor temperature is rapidly changed in case of ventilating since the outdoor air sucked to the indoor could not absorb heat in the indoor air. Also, energy consumption for recovering the indoor air is increased and indoor air conditioning performance is degraded.

That is, as shown in FIG. 4, particles of viscous air which flow inside a pipe of the first and second corrugation plates 22 and 24 stick on the surface contacted on a surface of the inside of the pipe when the viscous air flows on the surface of the inside of the pipe. As the air gets apart from the surface of the inside of the pipe, the air recovers the speed and gains a speed of a free flow in a position at a predetermined distance from the surface of the solid material. At this time, as the air is get apart from the surface of the inside of the pipe, a boundary layer S is formed.

As described above, as the air flowing on the surface of the inside of the pipe is processed, the boundary layer is developed and the air gets apart from the surface of the inside of the pipe, thus to degrade heat transfer efficiency that the heat of the indoor air is transferred to the outdoor air through the base plate 20.

DISCLOSURE OF THE INVENTION

Therefore, an object of the present invention is to provide a heat exchanger of a ventilating system, capable of improving heat transfer performance by restraining development of the boundary layer by increasing turbulence of outdoor and indoor air passing through the heat exchanger.

To achieve these and other advantages and in accordance with the purpose of the present invention, as embodied and broadly described herein, there is provided a heat exchanger of a ventilating system, including heat exchange plates which are laminated at a predetermined interval, first vibration members which are laminated among the heat exchange plates, for generating turbulence in outdoor air passing through a first air path, being aligned in the first air path through which the outdoor air passes and second vibration members for generating turbulence in the indoor air passing through a second air path, being aligned in the second air path through which indoor air passes.

The heat exchanger of the ventilating system includes first partitions which are respectively attached on the both side surfaces of the heat exchanger through which the outdoor air passes, for closing the side surface where the second vibration member is aligned and second partitions which are respectively attached on the other both side surfaces of the heat exchanger through which the indoor air passes, for closing the side surface where the first vibration member is aligned.

The first and second vibration members include a fixing portion which is attached on the upper surface of the heat exchange plate, and a vibration portion which is curved at a predetermined angle from the fixing portion, for generating turbulence in the flowing air.

The first and second vibration members are formed with an elastic body having a predetermined elasticity that the vibration portion is bent to the rear direction when the air is collided with a front surface thereof.

The first and second vibration members are formed with metal materials having a predetermined elasticity.

The first and second vibration members are formed with paper materials having a predetermined elasticity.

The first and second vibration members are formed with plastic materials having a predetermined elasticity.

The first row vibration members are aligned on the upper surface of the heat exchange plate at a predetermined interval, second row vibration members are aligned at the rear of the first row vibration members from at a predetermined interval from the first row vibration member, the first and second vibration members are repeatedly aligned at an identical interval, and the second row vibration member is positioned among the first row vibration members.

The interval among the vibration members of the first row portions and second row portions is d1 and the interval among the vibration members of the first row portions and second row portions is d2, the formula of $5 \leq d2/d1 \leq 10$ is satisfied.

If the width of the vibration members of the first row portions and second row portions is L1 and the width of the vibration members of the first row portions and second row portions is L2, the formula of $1 \leq L1/L2 \leq 5$ is satisfied.

If the thickness of the vibration members of the first row portions and second row portions is t1 and the thickness of the heat exchange plates is t2, the thickness of the first row portions and second row portions and the thickness of the heat exchange plates satisfy a formula of $0.5 \leq t2/t1 \leq 1$.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Reference will now be made in detail to the preferred embodiments of the present invention, examples of which are illustrated in the accompanying drawings.

As the embodiment of the heat exchanger of the ventilating system in accordance with the present invention, there can be a plurality of them, and hereinafter, the most preferable one will be described.

Figure 5:
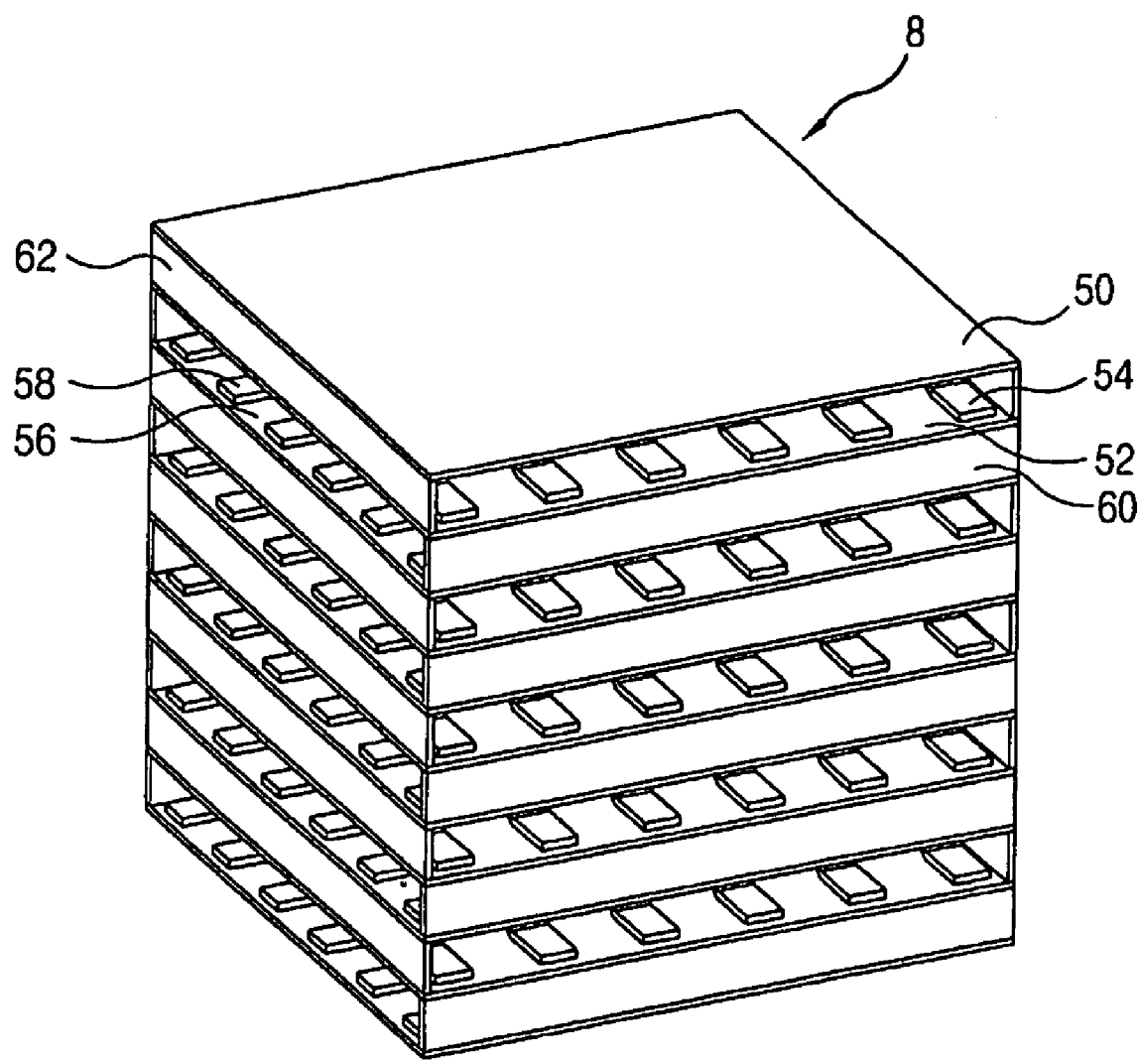
FIG. 5 is a partial perspective view showing a heat exchanger of a ventilating system in accordance with the present invention.

FIG. 5 is a perspective view showing a heat exchanger of a ventilating system in accordance with the present invention.

Figure 1:
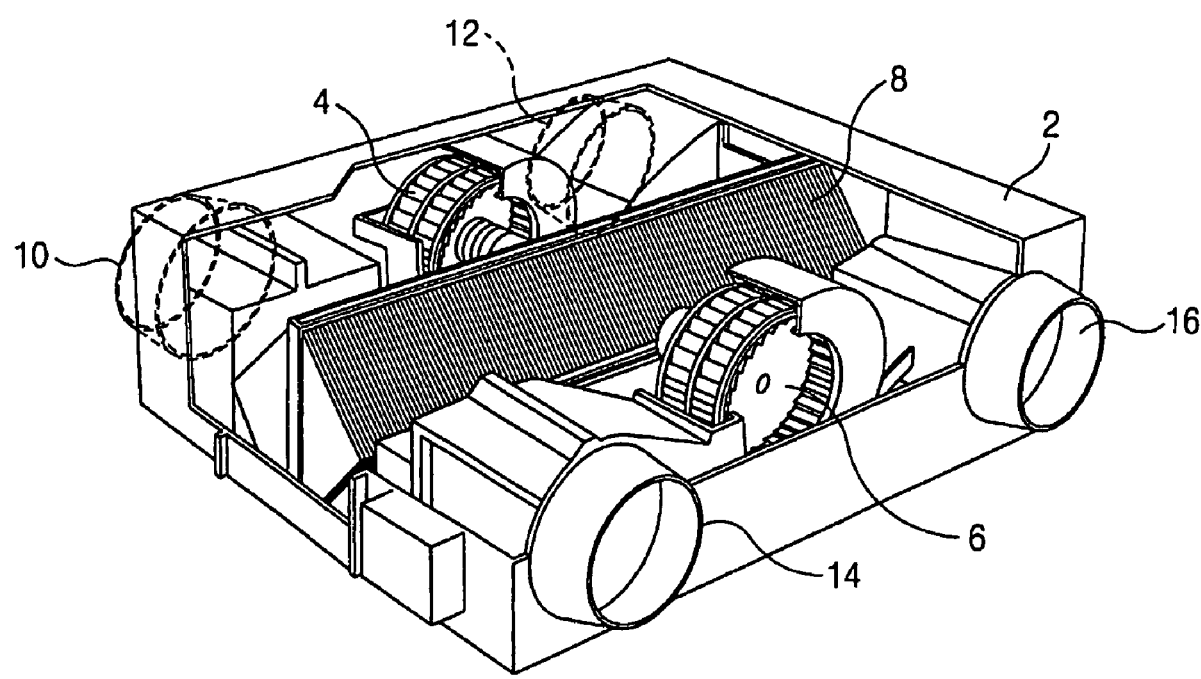
FIG. 1 is a partially cut perspective view showing the structure of a general ventilating system.
Figure 2:
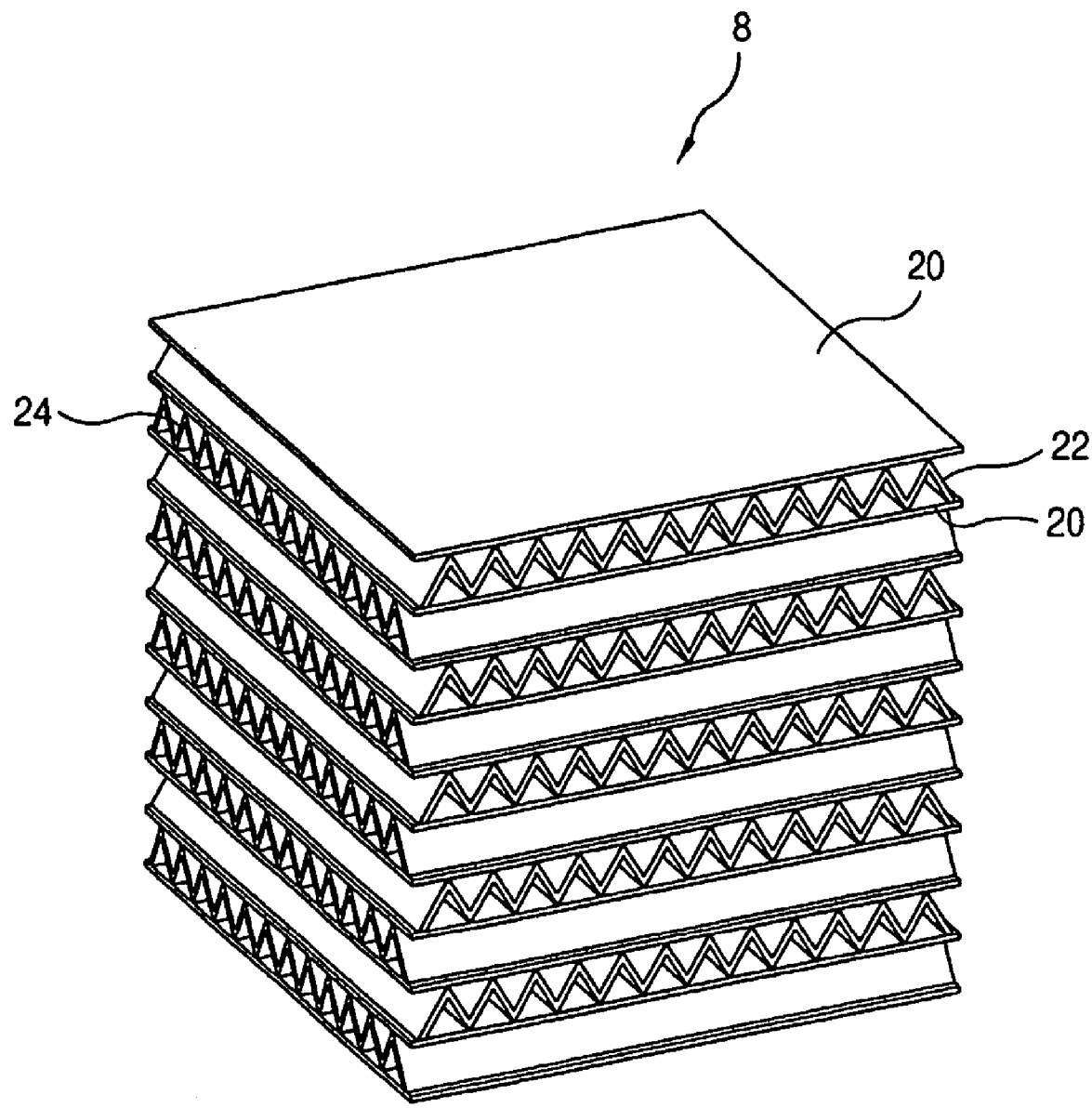
FIG. 2 is a partial perspective view showing a conventional heat exchanger of a ventilating system.
Figure 3:
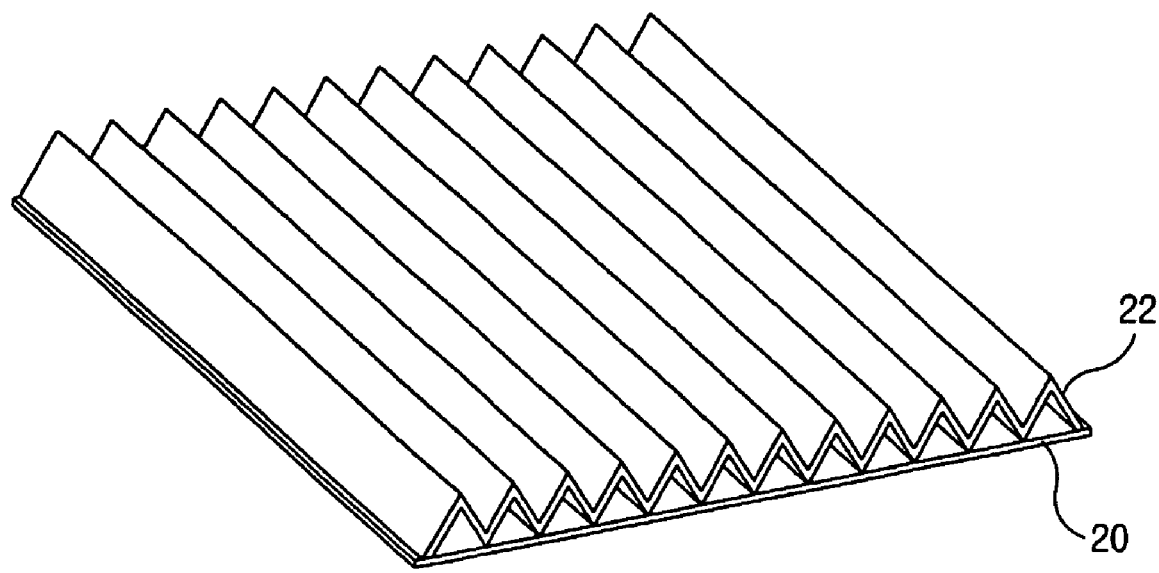
FIG. 3 is a perspective view showing a conventional corrugation plate of the heat exchanger of a ventilating system.
Figure 4:
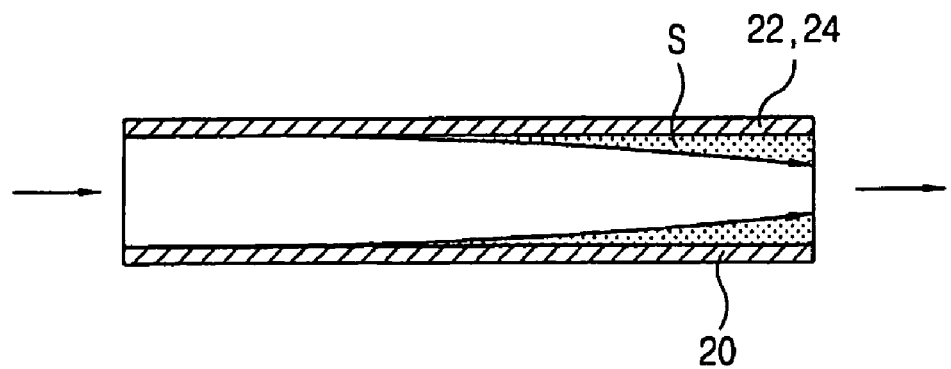
FIG. 4 is a cross-sectional view showing a movement of the air in the pipe to which the conventional heat exchanger of a ventilating system is supplied.

With reference to FIG. 1, in the ventilating system in accordance with the present invention, a case 2 is mounted to penetrate a wall which divides the indoor and outdoor, a side surface of the case 2 is positioned outdoors and the other side surface is positioned indoors. Here, an outdoor suction hole 10 through which the outdoor air is sucked and an outdoor discharging hole 12 through which the indoor air is discharged are respectively formed on a side surface positioned at the outdoor of the case 2, and an indoor discharging hole 14 through which the outdoor air is discharged to the indoor and an indoor suction hole 16 through which the indoor air is sucked are respectively connected on a side surface positioned at the indoor of the case 2.

A discharging blowing fan 4 for giving a blowing pressure for discharging the indoor air to the outdoor is installed in a position connected with the outdoor discharging hole 12 inside the case 2, and a suction blowing fan 6 for giving a blowing pressure for sucking the outdoor air to the indoor is installed in a position connected with the indoor discharging hole 14 inside the case 2.

An air cleaner (not shown) for removing foreign materials, dust and the like contained in the outdoor air is installed on the suction channel inside the case 2, and a heat exchanger 8 for transferring heat of the discharged indoor air to the sucked indoor air is installed inside the case 2.

As shown in FIG. 5, the heat exchanger 8 includes heat exchange plates 50 which are laminated in a thin plate shape at a predetermined interval, first vibration members 54 which are attached among the heat exchange plates 50, for generating turbulence in the outdoor air passing through a first air path 52, being aligned in the first air path 52 through which outdoor air passes as plural, and second vibration members 58 for generating turbulence in the indoor air passing through a second air path 56, being aligned in the second air path 56 through which indoor air passes, as plural.

First partitions 60 for closing the second air path 56 are respectively attached on the both side surfaces of the heat exchanger 8 through which the outdoor air passes, and second partitions 62 for closing the second air path 56 are respectively attached on the other both side surfaces of the heat exchanger 8 through which the indoor air passes.

The first vibration member 54 and second vibration member 58 are attached in the direction that air passes, and is laminated in turn to be crossed with each other to generate turbulence in the air.

Figure 6:
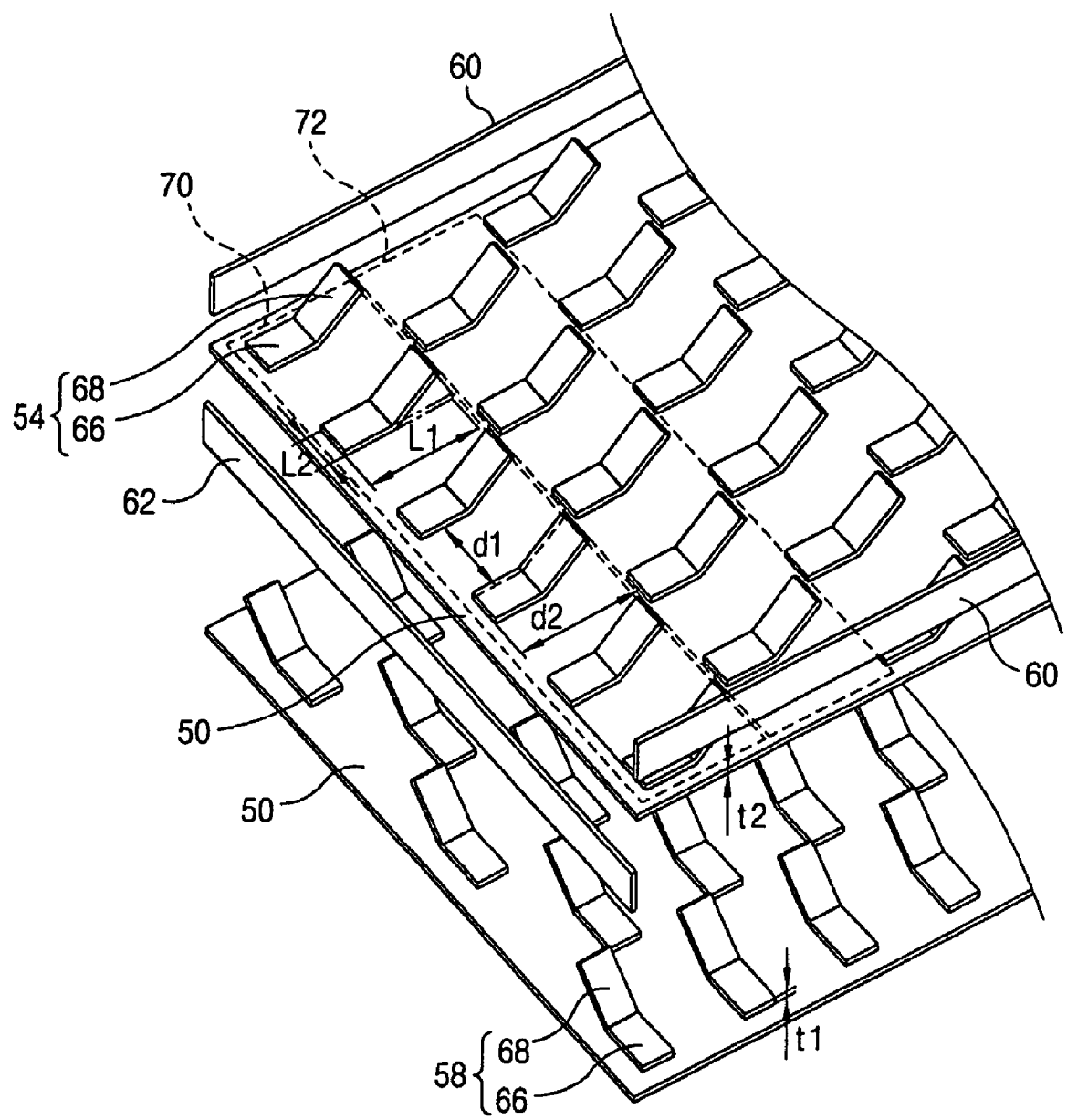
FIG. 6 is a partially disassembled perspective view showing the heat exchanger of the ventilating system in accordance with an embodiment of the present invention.

When describing the concrete shapes of the vibration members 54 and 58, as shown in FIG. 6, The vibration members are formed in a shape of a thin plate which is composed of a fixing portion 66 which is attached on the upper surface of the heat exchange plate 50, and a vibration portion 68 which is curved at a predetermined angle from the fixing portion 66, for generating turbulence in th for turbulence in thable that the fixing portion 66 is attached by using an adhesive on the upper surface of the heat exchange plate 50, and the method can be any method that can attach the fixing portion 66 on the upper surface of the heat exchange plate 50.

Such vibration members 54 and 58 are formed as an elastic body having a predetermined elasticity that the vibration portion 68 is bent to the rear direction when air is collided with the front surface thereof, and more definitely, it is desirable that the members are formed with thin aluminum materials or paper materials.

Also, the vibration members 54 and 58 can be manufactured with plastic materials such as the polyethylene or polypropylene.

The vibration members 54 and 58 include first row portions 70 which are aligned at a predetermined interval on the upper surface of the heat exchange plate 50, and second row portion 72 which are aligned at a predetermined interval from the first row portion 70 at the rear of the first row portion 70, and the vibration members are composed by repeating a predetermined number of the second row portion 72 repeatedly aligned in spaces among the first row portions.

Here, it is desirable that the interval d1 among the vibration members of the first row portions 70 and second row portions 72 and the interval d2 among the vibration members of the first row portions 70 and second row portions 72 are aligned so that they satisfy the formula of $5 \leq d2/d1 \leq 10$. In addition, it is desirable that the width L2 and length L1 of the vibration members satisfy the formula of $1 \leq L1/L2 \leq 5$.

It is desirable that the thickness t1 of the vibration members and the thickness t2 of the heat exchange plates satisfy the formula of $0.5 \leq t2/t1 \leq 1$.

The operation of the heat exchanger of the ventilation system in accordance with an embodiment of the present invention with the above structure will be described as follows.

Figure 7:
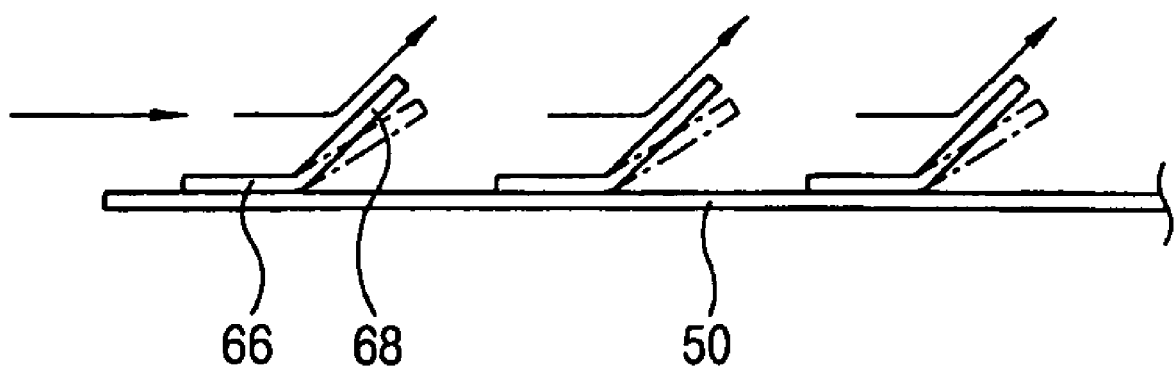
FIG. 7 is a cross-sectional view showing the heat exchanger of the ventilating system in accordance with the embodiment of the present invention.

FIG. 7 is a view showing operational status of the air passing through the heat exchanger in accordance with the embodiment of the present invention.

When the suction blowing fan 6 is driven, the outdoor air is sucked through the outdoor suction hole 10 and various dusts and foreign materials are removed passing through the air cleaner, and the air is supplied to the indoor by passing the first air path 52 through the indoor discharging hole 14. When the discharging blowing fan 4 is driven, the indoor air is sucked through the indoor suction hole 16, and is discharged into the outdoor by passing the second air path through the outdoor discharging hole 12.

Here, as the indoor air passing through the first air path 52 and the outdoor air passing through the second air path 56 flow while being crossed with each other centering around the heat exchange plate 50, heat contained in the indoor air is sucked to the outdoor air through the heat exchange plate 50, and the completely heat-exchanged outdoor air is supplied to the indoor.

In the operation of the heat exchanger, the outdoor air is collided with the surfaces of the first vibration members 58 and dispersed in all directions. Therefore, heat transfer performance to the heat exchange plate 50 can be improved as the air flows in contact with the surface of the heat exchange plate 50. As the indoor air flowed to the second air path 56 is dispersed in all directions, while being collided with the surface of the second vibration member 58 and flows in contact with on the surface of the heat exchange plate 50, thus to improve heat transfer performance to the heat exchange plate 50.

As the present invention may be embodied in several forms without departing from the spirit or essential characteristicsrit or essential characteristicsrstood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

INDUSTRIAL APPLICABILITY

In the heat exchanger of the ventilating system in accordance with the present invention with the above structure, turbulence of the outdoor and indoor air can be increased by the operation of the first and second vibration members by attaching the first vibration member on the first air path through which the outdoor air passes and the second vibration member in the second air path through which the indoor air passes, and accordingly, the heat transfer performance can be improved by restraining development of a boundary layer.

Also, since the heat transfer performance of the heat exchanger is excellent, the indoor temperature can be uniformly maintained. Accordingly, the indoor environment can be made to be comfortable, and energy consumption can be reduced by minimizing the change of the indoor temperature.

The invention claimed is:

1. A heat exchanger of a ventilating system, comprising:
heat exchange plates which are laminated at a predetermined interval, a first air path and a second air path being respectively located between two adjacent heat exchange plates;
first vibration members for generating turbulence in outdoor air passing through the first air path, the first vibration members being located on one of the two adjacent heat exchange plates corresponding to the first air path and being aligned in the first air path; and
second vibration members for generating turbulence in indoor air passing through the second air path, the second vibration members being located on one of the two adjacent heat exchange plates corresponding to the second air path and being aligned in the second air path, wherein each of the first and second vibration members includes a fixing portion and a vibration portion, the fixing portion being attached on an upper surface of the corresponding one of the two adjacent heat exchange plates, the vibration portion being folded at a predetermined angle from the fixing portion along a fold line, the fold line being substantially perpendicular to an air flow direction in the corresponding air path.

2. The exchanger of claim 1, further comprising:

first partitions which are respectively attached on the both side surfaces of the heat exchanger through which the outdoor air passes, for closing the side surface where the second vibration member is aligned; and second partitions which are respectively attached on the other both side surfaces of the heat exchanger through which the indoor air passes, for closing the side surface where the first vibration member is aligned.

3. The exchanger of claim 1, wherein the first and second vibration members are formed with an elastic body having a predetermined elasticity that the vibration portion is bent to the rear direction when the air is collided with a front surface thereof.

4. The exchanger of claim 1, wherein the first and second vibration members are formed with metal materials having a predetermined elasticity.

5. A heat exchanger of a ventilating system, comprising:

heat exchange plates which are laminated at a predetermined interval;

first vibration members which are laminated among the heat exchange plates, for generating turbulence in outdoor air passing through a first air path, being aligned in the first air path through which the outdoor air passes; and second vibration members for generating turbulence in the indoor air passing through a second air path, being aligned in the second air path through which indoor air passes, wherein the first and second vibration members include a fixing portion which is attached on the upper surface of the heat exchange plate, and a vibration portion which is curved at a predetermined angle from the fixing portion, for generating turbulence in the flowing air, wherein the first and second vibration members are formed with paper materials having a predetermined elasticity.

6. A heat exchanger of a ventilating system, comprising:

heat exchange plates which are laminated at a predetermined interval;

first vibration members which are laminated among the heat exchange plates, for generating turbulence in outdoor air passing through a first air path, being aligned in the first air path through which the outdoor air passes; and second vibration members for generating turbulence in the indoor air passing through a second air path, being aligned in the second air path through which indoor air passes, wherein the first and second vibration members include a fixing portion which is attached on the upper surface of the heat exchange plate, and a vibration portion which is curved at a predetermined angle from the fixing portion, for generating turbulence in the flowing air, wherein the first and second vibration members are formed with plastic materials having a predetermined elasticity.

7. A heat exchanger of a ventilating system, comprising:

heat exchange plates which are laminated at a predetermined interval;

first vibration members which are laminated among the heat exchange plates, for generating turbulence in outdoor air passing through a first air path, being aligned in the first air path through which the outdoor air passes; and second vibration members for generating turbulence in the indoor air passing through a second air path, being aligned in the second air path through which indoor air passes, wherein the first and second vibration members include a fixing portion which is attached on the upper surface of the heat exchange plate, and a vibration portion which is curved at a predetermined angle from the fixing portion, for generating turbulence in the flowing air, wherein first row vibration members are aligned on the upper surface of the heat exchange plate at a predetermined interval, second row vibration members are aligned at the rear of the first row vibration members from at a predetermined interval from the first row vibration member, the first and second vibration members are repeatedly aligned at an identical interval, and the second row vibration member is positioned among the first row vibration members.

8. The exchanger of claim 7, wherein if the interval among the vibration members of the first row portions and second row portions is d1 and the interval among the vibration members of the first row portions and second row portions is d2, the formula of $5 \leq d2/d1 \leq 10$ is satisfied.

9. The exchanger of claim 7, wherein if the width of the vibration members of the first row portions and second row portions is L1 and the width of the vibration members of the first row portions and second row portions is L2, the formula of $1 \leq L1/L2 \leq 5$ is satisfied.

10. The exchanger of claim 7, wherein if the thickness of the vibration members of the first row portions and second row portions is t1 and the thickness of the heat exchange plates is t2, the thickness of the first row portions and second row portions and the thickness of the heat exchange plates satisfy a formula of $0.5 \leq t2/t1 \leq 1$.

11. The exchanger of claim 1, wherein the fixing portion is a substantially flat plate parallel to the upper surface of the corresponding one of the two adjacent heat exchange plates.

12. The exchanger of claim 11, wherein the fixing portion is in contact with the upper surface of the corresponding one of the two adjacent heat exchange plates.

13. The exchanger of claim 11, wherein the fixing portion extends from a first end thereof to a second end thereof along the air flow direction in the corresponding air path, and the vibration portion is another substantially flat plate extending from the second end of the fixing portion.

14. The exchanger of claim 1, wherein each of the first and second vibration members has the single fold line only.

15. The exchanger of claim 1, wherein each of the first vibration members in the first air path is spaced apart from the other of the first vibration members.

* * * * *